(12) United States Patent
Purhonen et al.

(10) Patent No.: US 9,450,514 B2
(45) Date of Patent: Sep. 20, 2016

(54) METHOD AND APPARATUS FOR MINIMISING A CIRCULATING CURRENT OR A COMMON-MODE VOLTAGE OF AN INVERTER

(71) Applicant: ABB OY, Helsinki (FI)

(72) Inventors: Mikko Purhonen, Lappeenranta (FI); Tero Viitanen, Helsinki (FI)

(73) Assignee: ABB Technology OY, Helsinki (FI)

( * ) Notice: Subject to any disclaimer, the term of this patent is extended or adjusted under 35 U.S.C. 154(b) by 0 days.

(21) Appl. No.: 14/540,647

(22) Filed: Nov. 13, 2014

(65) Prior Publication Data

US 2015/0131345 A1 May 14, 2015

(30) Foreign Application Priority Data

Nov. 14, 2013 (FI) ...................................... 20136117

(51) Int. Cl.
*H02M 5/458* (2006.01)
*H02M 7/44* (2006.01)
*H02M 5/45* (2006.01)
*H02M 7/493* (2007.01)
*H02J 3/38* (2006.01)

(52) U.S. Cl.
CPC ............. *H02M 7/44* (2013.01); *H02M 5/4505* (2013.01); *H02M 7/493* (2013.01); *H02J 3/385* (2013.01); *Y02E 10/58* (2013.01)

(58) Field of Classification Search
CPC .. H02M 7/5387; H02M 5/4485; H02M 1/44; H02M 2001/123; H02M 7/129
USPC .................................. 363/16–20, 34–41, 132
See application file for complete search history.

(56) References Cited

U.S. PATENT DOCUMENTS

| | | | | |
|---|---|---|---|---|
| 5,852,558 A | * | 12/1998 | Julian | ................. H02M 7/5387 363/132 |
| 6,452,290 B1 | * | 9/2002 | Yoshioka | .............. H02M 7/493 307/82 |
| 8,659,917 B2 | * | 2/2014 | Sakakibara | ......... H02M 5/4585 363/132 |
| 8,698,443 B2 | * | 4/2014 | Hasegawa | .............. G04C 3/143 318/466 |
| 8,817,499 B2 | * | 8/2014 | Videt | ...................... H02M 1/44 363/37 |
| 2006/0034364 A1 | | 2/2006 | Breitzmann et al. | |
| 2012/0081932 A1 | | 4/2012 | Videt et al. | |
| 2012/0201056 A1 | * | 8/2012 | Wei | .................... H02P 21/0003 363/37 |

FOREIGN PATENT DOCUMENTS

| | | |
|---|---|---|
| FI | 116105 B | 9/2005 |
| FI | 116649 B | 1/2006 |
| WO | 2011/160644 A2 | 12/2011 |
| WO | WO 2011/160644 | * 12/2011 |

OTHER PUBLICATIONS

Finnish Search Report mailed on Jul. 16, 2014.

(Continued)

*Primary Examiner* — Rajnikant Patel
(74) *Attorney, Agent, or Firm* — Taft Stettinius & Hollister LLP

(57) ABSTRACT

The present disclosure discloses a method and an apparatus implementing the method for minimizing a circulating current of parallel-connected inverters. The method can include, for at least one parallel-connected inverter, measuring a common-mode voltage of the inverter, and controlling a cycle length of the switching cycle on the basis of the common-mode voltage.

15 Claims, 4 Drawing Sheets

(56) References Cited

OTHER PUBLICATIONS

Mikko Purhonen et al., "Wireless Circulating Current Control for Parallel Connected Photovoltaic Inverters", Africon 2013, Sep. 9-12, 2013, IEEE Conference Paper, 4 pages, AN 4147092.

The extended European Search Report issued on May 7, 2015, in corresponding European Patent Application No. 14192055.3-1809 (7 pages).

* cited by examiner

METHOD AND APPARATUS FOR MINIMISING A CIRCULATING CURRENT OR A COMMON-MODE VOLTAGE OF AN INVERTER

RELATED APPLICATION(S)

This application claims priority under 35 U.S.C. §119 to Finnish application No. 20136117 filed on Nov. 14, 2013 in Finland, the entire content of which is hereby incorporated by reference.

FIELD

The present disclosure relates to parallel-connected inverters, and particularly to minimizing circulating currents in parallel-connected inverters.

BACKGROUND INFORMATION

In high power applications, a parallel connection of inverters can be the most cost effective way of implementation. A plurality of parallel-connected inverters can be arranged to synchronously supply a common load or grid, for example.

Even if the output voltages produced by the parallel-connected inverters are synchronous, circulating currents can appear. The inverters generate output voltages by controlling switches in their inverter bridges to different operating states, e.g., to conducting or non-conducting states. Modulators in the inverter control the operating states to form switching patterns. By controlling the duty ratios of the switching patterns during switching cycles of the modulators, desired output voltages can be produced.

Each modulator of a parallel-connected inverter can form switching patterns on the basis of a locally generated switching frequency. The switching frequencies of the modulators can differ from each other or have a phase shift between each other, which can lead to a phase shift between the switching patterns of generated by the modulators. Thus, the corresponding switches in parallel-connected inverters can be in different operating states. As a result, paths for circulating currents through the switches in different operating states can appear. A circulating current flowing on such a path can cause undesirable strain to the inverter and the output filter.

A circulating current invoked by a phase shift between modulators can appear in parallel-connected inverters having their DC links tied together, for example. FIG. 1a shows an exemplary arrangement where two inverters 11 are connected in parallel and share a DC link 12. The inverters 11 supply a load 13 through output filters 14. The output filters can be LCL filters, for example. The DC link 12 completes a path of circulating current through the inverters 11 and the output filters 14.

A circulating current can also appear in applications where each inverter can include a DC link. In solar parks, for example, parallel-connected inverters can be separate units that are used for transforming the produced electric energy. The units can each have their own output filters and they can be located at a long distance away from each other.

FIG. 1b illustrates an arrangement where four parallel-connected solar inverters 15 supply a medium voltage transformer 16. The DC links of the solar inverters 11 are not directly connected to each other. However, the DC links can be coupled to each other through ground capacitances formed by the solar panels and their grounded frames. Thus, the grounding between the panels can complete paths for circulating currents.

Circulating currents can be limited (e.g., reduced or elimated) by using communication links between the parallel-connected inverters for synchronizing the inverters. The circulating currents can also be limited by using common-mode current filters. However, the additional components specified for varying forms of the communication links or the current filtering can be expensive and/or bulky.

Finnish patents FI116649 and FI116105 describe methods based on measuring the circulating current and then synchronizing the parallel-connected inverters on the basis of the current measurement. However, additional current sensors can be used for these approaches.

SUMMARY

A method for minimizing a circulating current or a common-mode voltage of an inverter is disclosed. The inverter having at least one of an inverter bridge and an active rectifier bridge, the method comprising: measuring a common-mode voltage of the inverter; and one of: controlling a cycle length of a switching cycle of the inverter bridge based on the measured common-mode voltage; or controlling a cycle length of a switching cycle of the active rectifier bridge based on the measured common-mode voltage.

An inverter configured for minimizing a circulating current or a common-mode voltage of the inverter is disclosed, the inverter comprising: at least one of an inverter bridge and an active rectifier bridge; and means configured to: measure a common-mode voltage of the inverter; and one of: control a cycle length of a switching cycle of the inverter bridge based on the measured common-mode voltage; or control a cycle length of a switching cycle of the active rectifier bridge based on the measured common-mode voltage.

BRIEF DESCRIPTION OF THE DRAWINGS

In the following the disclosure will be described in greater detail by means of exemplary embodiments with reference to the attached drawings, in which.

DETAILED DESCRIPTION

Figure 1A:
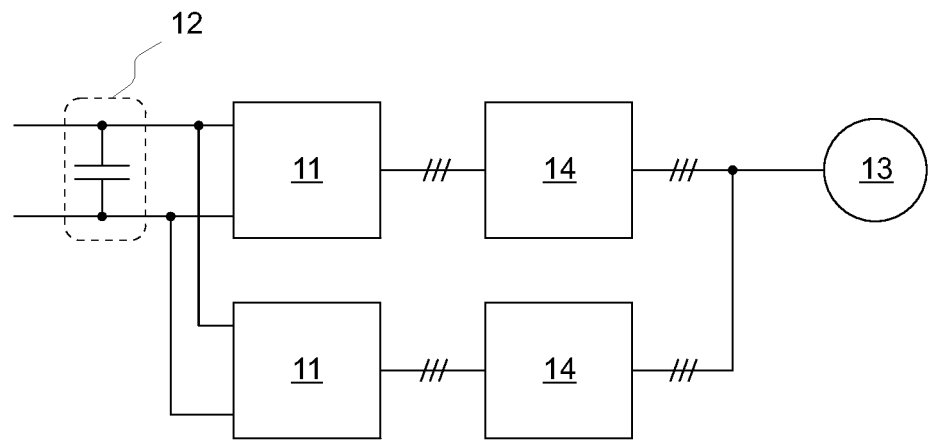
FIGS. 1a and 1b show exemplary arrangements of parallel-connected inverters in accordance with known implementations.
Figure 1B:
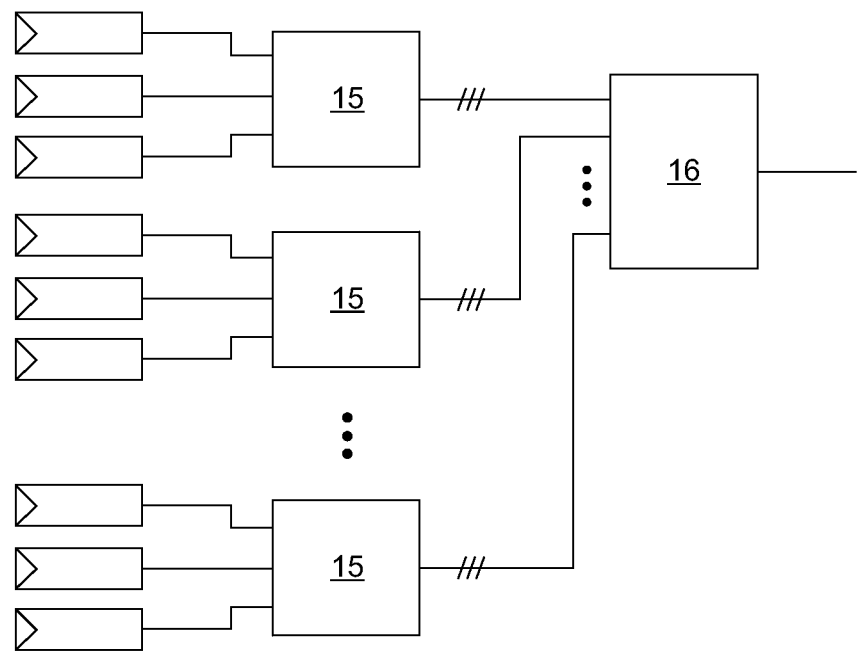

Exemplary embodiments of the present disclosure provide a method and an apparatus to alleviate the above disadvantages through minimizing circulating currents of parallel-connected inverters by synchronizing modulation of the inverter bridges of the inverters. The inverters can be synchronized by measuring common-mode voltages of the inverters. Depending on where the common mode voltage is measured, the inverters can be synchronized by controlling common-mode voltages of the inverters to a minimum or to a maximum. In order to achieve the control goal, e.g., a minimum or a maximum common-mode voltage, lengths of switching patterns of the parallel-connected inverters can be controlled on the basis of the measured common-mode voltage. For example, a delay can be added to a modulation signal in order to minimize the common mode voltage, and thereby, synchronize the switching frequency of the parallel-connected inverters.

By controlling the switching frequency on the basis of the common-mode voltage, the inverters can be synchronized without current measurements or communication between the each other.

Exemplary embodiments of the present disclosure provide for minimizing a circulating current of parallel-connected inverters. The parallel-connected inverters can share a common DC link or they can have their own DC links, for example. The inverters can drive a common load.

A modulator of an inverter can generate switching patterns which are used to output voltages. By controlling the duty ratios of the switching patterns during switching cycles of the modulator, a desired output voltage can be produced.

In addition to desired output voltages, the switching patterns can generate common-mode voltages. In case of parallel-connected inverters, circulating currents can be caused by differences in common-mode voltages. Thus, parallel-connected inverters can be configured to minimize the circulating currents by trying to generate same common-mode voltages.

However, if the modulators of the parallel-connected inverters do not synchronously generate switching patterns, the generated switching patterns can differ from each other momentarily thereby inducing common-mode voltages at the switching frequency of the modulators.

The common-mode voltages can be measured, and the circulating currents can be controlled on the basis of the common-mode voltages. The circulating currents can be controlled by altering the lengths of switching cycles of the parallel-connected inverters in a manner that the duty ratios of the switching cycles remain unaffected.

By controlling the cycle lengths of modulators of parallel-connected inverters, the modulators can be synchronized.

The cycle length can be altered by adding a delay to the switching cycle, for example. Alternatively, the length of a switching cycle can be altered by adjusting the switching frequency. By using a slower switching frequency, the length of the switching cycle can be increased, and by using a higher frequency, the length can be decreased.

Thus, exemplary embodiments described herein can include, for at least one parallel-connected inverter, measuring a common-mode voltage of the inverter, and controlling a length of the switching cycle on the basis of the common-mode voltage.

Depending on the embodiment, the common-mode voltage can be measured on the DC side or the AC side of the inverter bridge. In this context, the DC side, e.g., the DC link side, refers to the part of the inverter between the power supply and the inverter bridge. The AC side, e.g., the grid side, refers to the part of the inverter on the grid side of the inverter bridge and an output filter of the inverter. The measurements can be performed with respect to a grounded voltage potential of the frame of the inverter. Even if the inverter itself is not tied to the grounded potential of the frame, stray capacitances between the inverter and the frame can form a finite impedance which can act as a path for a circulating current.

The inverter itself can also be grounded by its DC link or by the star point of the grid filter, for example. If the grounding is on the grid side, e.g., the AC side, the common-mode voltage can be measured on the DC link side. If the grounding is on the DC link side, the common-mode voltage can be measured on the grid side.

An inverter configured to minimize a circulating current of an arrangement of parallel-connected inverters can include means, such as a meter, sensor, or any suitable measuring device as desired having circuitry, an integrated circuit, or a processor. The means can be configured to measure a common-mode voltage of the inverter, and to control a cycle length of the switching cycle on the basis of the common-mode voltage. The inverter can include a voltage sensor or sensors for measuring the common-mode voltage, for example.

Figure 2:
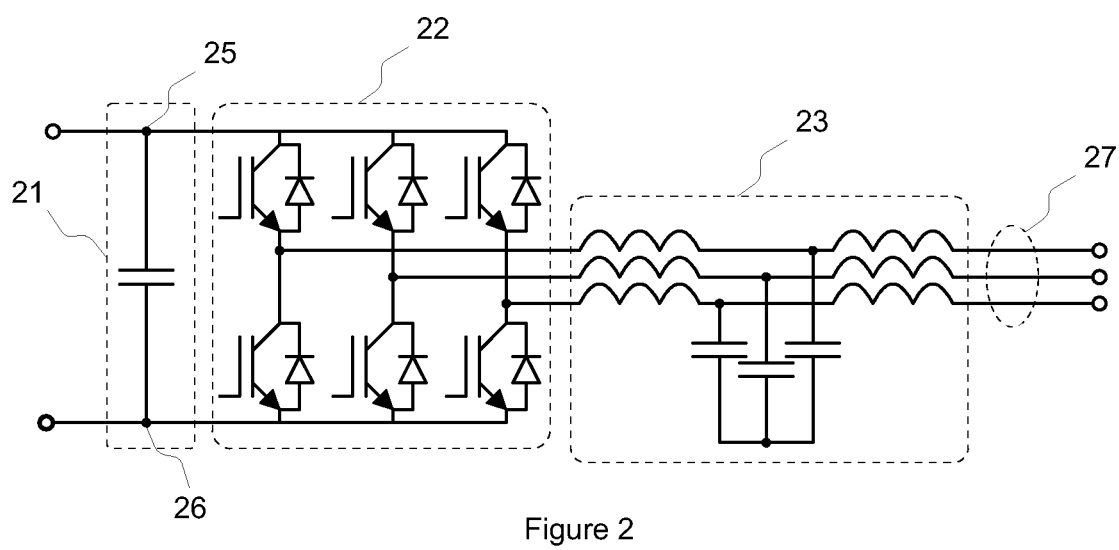
FIG. 2 shows exemplary measurement points on an inverter for an arrangement of parallel-connected inverters in accordance with an exemplary embodiment of the present disclosure.

FIG. 2 shows exemplary measurement points on an inverter for an arrangement of parallel-connected inverters in accordance with an exemplary embodiment of the present disclosure. In FIG. 2, the inverter is a two-level, three-phase inverter that can include a DC link 21, an inverter bridge 22, and a grid filter 23. The grid filter 23 in FIG. 2 is an LCL filter. The inverter supplies a three-phase grid 24.

An inverter bridge 22 can be considered to divide the inverter into two sides: the DC link side and the grid side. On the grid side, e.g., the AC side, the common-mode voltage can be measured on either pole 25 or 26 of the DC link 21, for example. On the AC link side, the common-mode voltage can be measured as a sum of phase voltages 27 against a ground level, between the grid filter 23 and the grid 24, for example.

FIGS. 3a to 3d show exemplary simulated waveforms of an arrangement of parallel-connected inverters in accordance with an exemplary embodiment of the present disclosure. In the simulations, the AC grid floats. Synchronized modulators of the parallel-connected inverters produce switching patterns which generate synchronous common-mode voltages alternating at the switching frequency of the modulators. The synchronous common-mode voltages drive the common-mode voltage of the floating grid. Thus, the resulting common-mode voltage of the grid is an average of the common-mode voltages of the inverters.

Figure 3A:
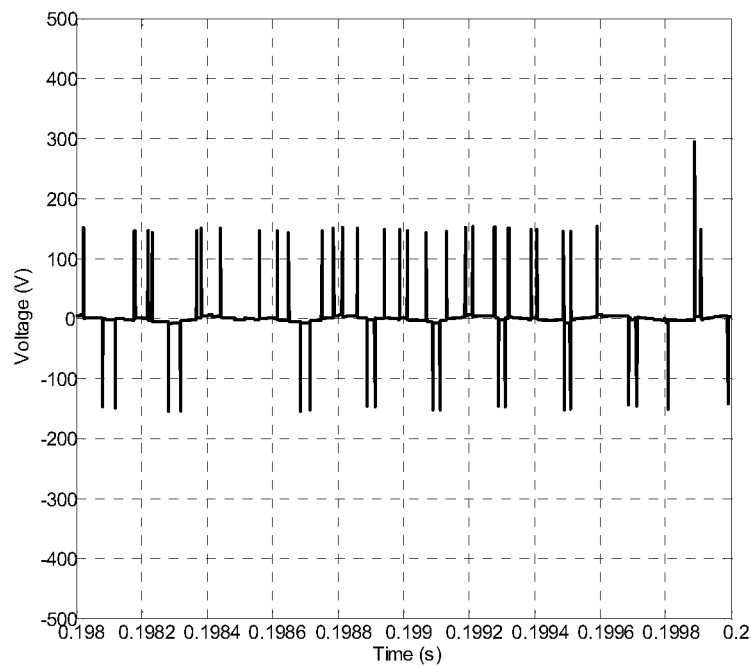
FIGS. 3a to 3d show exemplary simulated waveforms of an arrangement of parallel-connected inverters in accordance with an exemplary embodiment of the present disclosure.
Figure 3B:
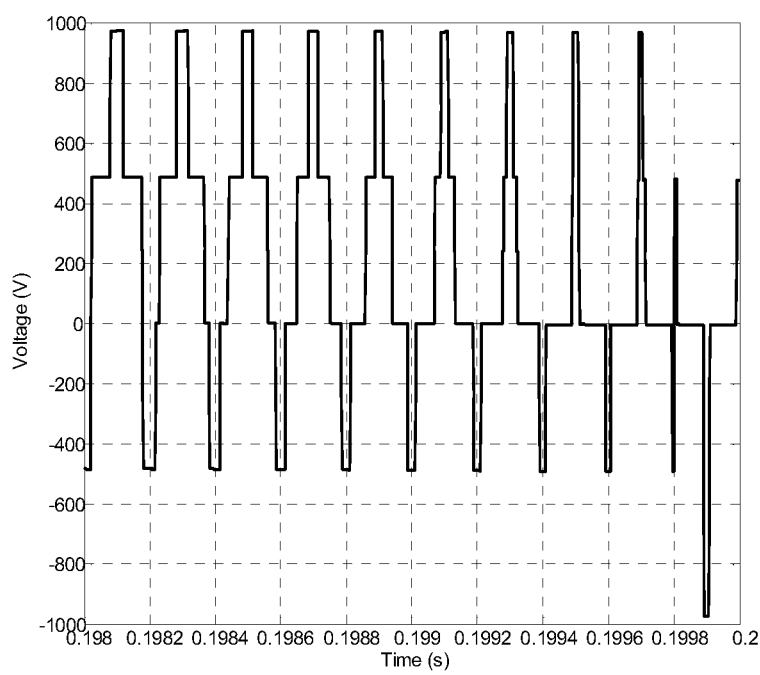

In FIGS. 3a and 3b, the simulated modulators of the parallel-connected inverters are in phase, and the circulating current is small.

FIG. 3a shows a common-mode voltage measured on the DC link side of the inverter bridge, and the common-mode voltage measured on the DC side can be quite small. In the simulation, a RMS value of the common-mode voltage on the DC side over a 100 ms period is 29 V.

As shown in FIG. 3b, however, on the grid side the common-mode voltage is the average of common-mode voltages generated by in-phase modulators and is therefore much higher. An RMS value of the common-mode voltage on the AC side over a 100 ms period is 460 V.

Figure 3C:
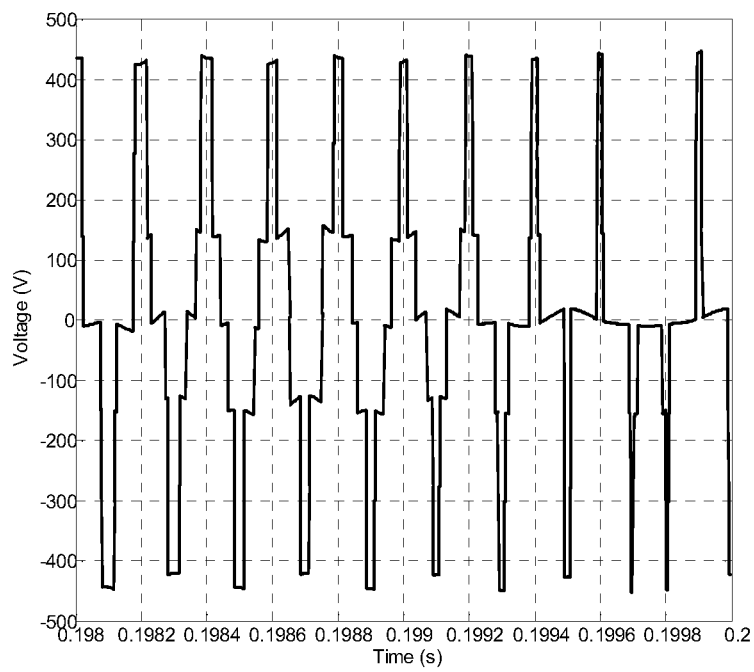
Figure 3D:
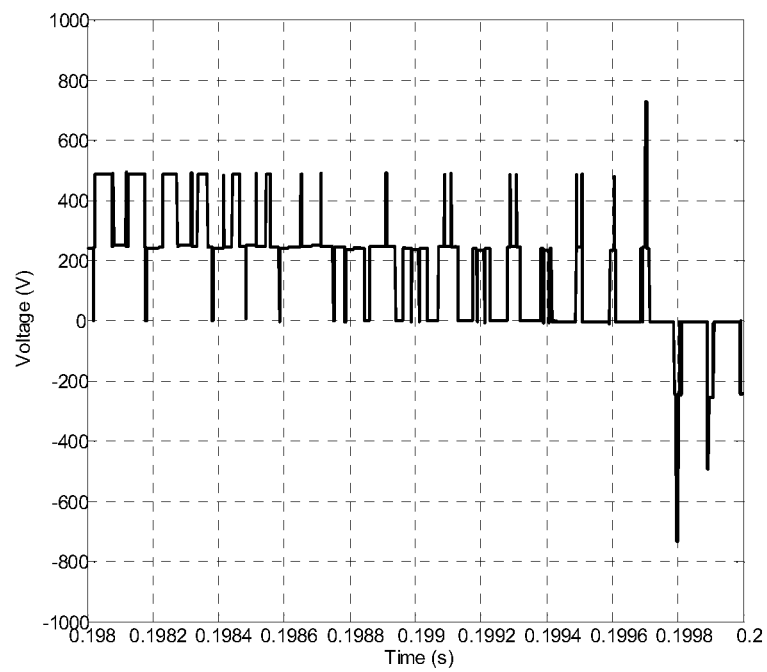

In FIGS. 3c and 3d, the modulators of the parallel-connected inverters are in opposite phases and the circulating current is high.

FIG. 3c shows the common-mode voltage on the DC link side. In FIG. 3c, the DC common-mode voltage on the DC side is much higher compared with the in-phase situation of FIG. 3a. Now the simulated RMS value of the common-mode voltage on the DC side over a 100 ms period is 229 V.

At the same time in FIG. 3d, the common-mode voltage on the grid side is much smaller compared with the in-phase situation of FIG. 3b. The common-mode voltages of the inverters are now in opposite phases and effectively cancel each other. Thus, their average is close to zero. However, FIG. 3d still shows that the AC side common-mode voltage contains a third harmonic component that is generated by the modulators. The simulated RMS value of the common-mode voltage on the AC side over a 100 ms period is now 254 V.

Exemplary embodiments of the present disclosure can depend on the measurement point of the common-mode voltage. For example, in embodiments where the common-mode voltage is measured on the DC side, controlling the length of the switching cycle can include minimizing an RMS value of the common-mode voltage. When the RMS value of measured common-mode voltage on the DC side is minimal, the modulators of the parallel-connected inverters are or substantially (e.g., nearly) synchronized. Thus, the circulating currents are also minimal.

Alternatively, if the common-mode voltage is measured on the AC-side, controlling the length of the switching cycle can include maximizing an RMS value of the measured common-mode voltage. The AC side common-mode voltage seen by the parallel-connected inverters is at a maximum when the modulators of the inverters operate in phase.

According to exemplary embodiments of the present disclosure, a controller for controlling of the length of the switching cycle can be implemented in various ways.

For example, the cycle length can be changed by a value of a first parameter. The change in the cycle length induces a change in the RMS value of the common-mode voltage. The change in the RMS value can be determined by comparing a measured RMS value to a previously measured value or values, for example.

A new value for the first parameter can then be calculated on the basis of the determined change in the RMS value of the common-mode voltage. The new value for the first parameter depends on the direction of the change in the RMS value. For example, if the determined change in the RMS value voltage is trending in the wrong direction, e.g. the RMS common-mode voltage increases when the aim is to minimize it, the first parameter can be given an opposite value of the previous value. Further, the magnitude of the change in the common-mode voltage can be used in determining the magnitude of the new value of the first parameter.

Depending on where the common-mode voltage is measured, each of the parallel-connected inverters can control its measured RMS value of the common-mode voltage to maximum or to minimum.

According to another exemplary embodiment, an instantaneous common-mode voltage on the DC side or the AC side of an inverter can be measured and compared the measured voltage with an instantaneous common-mode output voltage of the inverter. The length of the switching cycle can be controlled on the basis of the comparison. In FIG. 2, the common-mode output voltage of the inverter corresponds to the sum of phase voltages measured between the inverter bridge 22 and the grid filter 23. The instantaneous common-mode output voltage can be determined without measurements. The instantaneous common-mode output voltage can be calculated from the switching states of the switches in the inverter bridge, for example.

If the DC side common-mode voltage is measured, the length of the switching cycle can be controlled on the basis of an overlap between the measured DC side common mode voltage and the calculated common-mode output voltage, for example. By minimizing the overlap, the DC side common-mode voltage can be minimized.

If the AC side common-mode is measured, the control aim can be to drive the calculated common-mode output voltage to correspond the measured AC side common mode voltage.

Under certain conditions, the parallel-connected inverters can all produce the same common mode voltage. Thus, in each parallel-connected inverter, the calculated common-mode voltage is the same the measured AC side common-mode voltage (which is an average of the AC-side common-mode voltages produced by the inverters). As a result, the DC side common mode voltage of the inverter is minimal.

If the calculated common-mode output voltage and the measured AC side common-mode differ, the difference can be used for controlling the length of the switching cycle so that the difference is minimised. The cycle length can be controlled to maximize an overlap between the determined instantaneous common-mode output voltage and the measured AC side common-mode voltage, for example.

Exemplary embodiments of the present disclosure can be applied to various arrangements of parallel-connected inverters. For example, in one embodiment the parallel-connected inverters can be used in motor drives having active rectifier bridges and different modulation frequencies for the rectifier bridge and the inverter bridge by separating the bandwidths of the modulation frequencies from the common-mode voltage. In this manner, lengths of the switching cycles of the active rectifier bridge and the inverter bridge can be controlled separately. As a result, active rectifier bridges of parallel-connected inverters can be synchronized separately from the inverter bridges.

According to another embodiment of the present disclosure the parallel-connected inverters can be used in motor drive systems having a diode rectifier bridge on the grid side. Further, exemplary embodiments disclosed herein are applicable to parallel-connected inverters having a common DC side.

In addition, exemplary embodiments of the present disclosure can be configured for minimizing a DC side common-mode voltage of a single inverter having an active rectifier bridge. Exemplary embodiments can also be designed to control the switching cycle length of the switching cycle of the active rectifier bridge (or the inverter bridge) to synchronize the switching cycles of the active rectifier bridge and the inverter bridge.

Thus, the present disclosure can be configured for minimizing a circulating current or a common-mode voltage of at least one inverter that includes an inverter bridge. Exemplary embodiments of the present disclosure can include measuring a common-mode voltage of the inverter. A cycle length of a switching cycle of the inverter bridge can be controlled on the basis of the measured common-mode voltage. Alternatively, when the inverter can include an active rectifier bridge, a cycle length of a switching cycle of the active rectifier bridge can be controlled on the basis of the measured common-mode voltage.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for minimizing a circulating current or a common-mode voltage of an inverter comprising at least one of an inverter bridge and an active rectifier bridge, wherein modulation of the at least one of an inverter bridge and an active rectifier bridge comprises controlling a duty ratio during a switching cycle, wherein the switching cycle has a set length, the method comprising:
   measuring a common-mode voltage of the inverter; and
   one of:
      controlling the length of the switching cycle of the inverter bridge based on the measured common-mode voltage; or controlling the length of the switching cycle of the active rectifier bridge based on the measured common-mode voltage.

2. The method as claimed in claim 1 and configured for minimizing a common-mode voltage, wherein the inverter includes an active rectifier bridge, and the method comprises:
controlling the length of the switching cycle of the active rectifier bridge or the inverter bridge to synchronize the switching cycles of the active rectifier bridge and the inverter bridge.

3. The method as claimed in claim 1 for minimizing a circulating current of parallel-connected inverters, the method comprising:
for at least one parallel-connected inverter:
controlling the length of the switching cycle of the inverter's inverter bridge to synchronize the switching cycles of the inverter bridges of the parallel-connected inverters.

4. The method as claimed in claim 1 for minimizing a circulating current of parallel-connected inverters having active rectifier bridges, the method comprising:
for at least one parallel-connected inverter:
controlling the cycle length of the switching cycle of the inverter's active rectifier bridge to synchronize the switching cycles of the active rectifier bridges of the parallel-connected inverters.

5. The method as claimed in claim 3, wherein the common-mode voltage is measured on the DC-side.

6. The method as claimed in claim 3, wherein the common-mode voltage is measured on the AC-side.

7. The method as claimed in claim 5, wherein controlling the length of the switching cycle includes minimizing an RMS value of the common-mode voltage.

8. The method as claimed in claim 6, wherein controlling the length of the switching cycle includes maximizing an RMS value of the common-mode voltage.

9. The method as claimed in claim 1, wherein controlling the length of the switching cycle includes:
changing the length of the switching cycle by a value of a first parameter;
determining a change in the common-mode voltage induced by the change in the length of the switching cycle; and
determining a new value for the first parameter based on the determined change in the common-mode voltage.

10. The method as claimed in claim 1, wherein controlling the length of the switching cycle includes:
determining an instantaneous common-mode output voltage;
comparing the determined common-mode output voltage with the measured common-mode voltage; and
controlling the length of the switching cycle based on the comparison.

11. The method as claimed in claim 10, wherein the common-mode voltage is measured on the DC side, and wherein controlling the length of the switching cycle includes:
controlling the length of the switching cycle to minimize an overlap between the determined instantaneous common-mode output voltage and the measured DC side common-mode voltage.

12. The method as claimed in claim 10, wherein the common-mode voltage is measured on the AC side, and wherein controlling the length of the switching cycle includes:
controlling the length of the switching cycle to maximize an overlap between the determined instantaneous common-mode output voltage and the measured AC side common-mode voltage.

13. The method as claimed in claim 10, wherein the common-mode voltage is determined from the switching states of the switches in the inverter bridge.

14. An inverter configured for minimizing a circulating current or a common-mode voltage of the inverter, the inverter comprising:
at least one of an inverter bridge and an active rectifier bridge, configured such that modulation of the at least one of an inverter bridge and an active rectifier bridge comprises controlling a duty ratio during a switching cycle, wherein the switching cycle has a set length; and
means configured to:
measure a common-mode voltage of the inverter; and
one of:
control the length of the switching cycle of the inverter bridge based on the measured common-mode voltage; or
control the length of the switching cycle of the active rectifier bridge based on the measured common-mode voltage.

15. The inverter as claimed in claim 14, wherein the inverter is configured for minimizing a circulating current of an arrangement comprising parallel-connected inverters, wherein the inverter can include means configured to control the length of the switching cycle of the inverter's inverter bridge to synchronize the switching cycles of the inverter bridges of the parallel-connected inverters.

* * * * *